United States Patent
Shamshery et al.

(10) Patent No.: US 10,426,104 B2
(45) Date of Patent: Oct. 1, 2019

(54) PRESSURE COMPENSATING EMITTER HAVING VERY LOW ACTIVATION PRESSURE AND LARGE OPERATING RANGE

(71) Applicant: Massachusetts Institute of Technology, Cambridge, MA (US)

(72) Inventors: Pulkit Shamshery, Cambridge, MA (US); Amos G. Winter, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/245,320

(22) Filed: Aug. 24, 2016

(65) Prior Publication Data

US 2017/0142916 A1 May 25, 2017

Related U.S. Application Data

(60) Provisional application No. 62/258,067, filed on Nov. 20, 2015.

(51) Int. Cl.
*A01G 25/02* (2006.01)
*G05D 16/06* (2006.01)
*B05B 1/30* (2006.01)

(52) U.S. Cl.
CPC ........... *A01G 25/023* (2013.01); *A01G 25/02* (2013.01); *B05B 1/3006* (2013.01); *G05D 16/0647* (2013.01)

(58) Field of Classification Search
CPC .... A01G 25/023; A01G 25/02; B05B 1/3006; B05B 15/0291; B05B 15/069; G05D 16/0647

(Continued)

(56) References Cited

U.S. PATENT DOCUMENTS 2,460,647 A    2/1949  Miller
4,589,595 A *  5/1986  Havens ............... A01G 25/023
                                                239/542

(Continued)

FOREIGN PATENT DOCUMENTS

AU    633097      1/1993
ES    2229889     4/2005
WO    84/02828    8/1984

OTHER PUBLICATIONS

Notification Concerning Transmittal of International Preliminary Report on Patentability (Chapter I of the Patent Cooperation Treaty), for International Application No. PCT/US2016/053686, entitled: "Pressure Compensating Emitter Having Very Low Activation Pressure and Large Operating Range," dated May 31, 2018 (10 pgs).

(Continued)

*Primary Examiner* — Steven J Ganey
(74) *Attorney, Agent, or Firm* — Hamilton, Brook, Smith & Reynolds, P.C.

(57) ABSTRACT

Pressure-compensating emitter. The emitter includes an inlet connected to a source of pressurized water and an orifice in fluid communication with the inlet and extending into a channel including a raised land surrounding an outlet. A compliant membrane is positioned above the land in the chamber wherein pressurized water will cause the membrane to deform into contact with the land to alter flow through the outlet so as to provide a constant flow rate. Parameters of the emitter are selected so that the emitter has a large operating range and an activation pressure of 0.15 bar or below.

12 Claims, 10 Drawing Sheets

(58) Field of Classification Search
USPC ........ 239/542, 547, 145, 533.1, 533.13, 570
See application file for complete search history.

(56) References Cited

U.S. PATENT DOCUMENTS

| | | |
|---|---|---|
| 5,413,282 A | 5/1995 | Boswell |
| 5,711,482 A | 1/1998 | Yu |
| 5,794,849 A * | 8/1998 | Elder ................... A01G 25/023 239/542 |
| 8,511,586 B2 * | 8/2013 | Einav ................... A01G 25/023 239/547 |
| 2012/0097254 A1 | 4/2012 | Cohen |
| 2015/0090815 A1 | 4/2015 | Akritanakis |

OTHER PUBLICATIONS

PCT International Search Report and Written Opinion dated Dec. 7, 2016 for International Application No. PCT/US2016/053686 filed Sep. 26, 2016 entitled "Pressure Compensating Emitter Having Very Low Activation Pressure and Large Operating Range."
Taylor et al., A Mathematical Model for Pressure Compensating Emitter, Proceedings of the 2015 IDETC ASME 2015 International Design Engineering Technical Conference, 2015. pp. 1-10, ASME, New York, USA.

* cited by examiner

PRESSURE COMPENSATING EMITTER HAVING VERY LOW ACTIVATION PRESSURE AND LARGE OPERATING RANGE

This application claims priority to provisional application Ser. No. 62/258,067 filed on Nov. 20, 2015, the contents of which are incorporated herein by reference.

BACKGROUND OF THE INVENTION

This invention relates to irrigation emitters and more particularly to an irrigation emitter providing pressure compensation so that flow rate remains substantially constant as input pressure varies.

Drip irrigation systems are used to deliver water and/or nutrients directly to the root zone of a plant. In use, an online emitter is inserted into the water lateral lines. The emitter thus acts as a point source for water. Because water is delivered in a controlled way, it is possible to irrigate with substantially less water as compared to conventional water delivery systems including sprinklers and flooding methods. Drip irrigation systems also experience less water percolation, surface run off or evaporation, all saving water. Other advantages are fewer weeds as water is applied only to regions where it is required. Less fertilizer is used as a result of the targeted watering and higher yields result from the better soil moisture levels.

As water in drip irrigation systems travels through a pipe network including a sub main and lateral pipes from a water source out to a field, there is a continuous pressure loss due to frictional forces that develop between the pipe and flowing water. Other factors such as elevation can also result in water pressure variation. If non-pressure compensating emitters are used, the emitters subject to higher pressures will emit more water, leading to an uneven water distribution in the field. Plants closer to the water and pumping source get more water than the ones farther away. It is desirable that all emitters have uniform water flow rates along the lateral lines.

Pressure-compensating emitters have been developed that emit constant flow rate of water despite a fluctuation in input water pressure. Such pressure-compensating emitters thus enable longer lateral pipes to be used so that a larger area can be irrigated with the drip irrigation system.

Existing pressure-compensating emitters have a relatively high activation pressure and a limited operating range. Activation pressure is defined as the pressure above which an emitter begins pressure compensation. Because pumping power in an irrigation system is a function of the water pressure and its flow rate, a high activation pressure means higher power requirements leading to higher incurred costs in power systems, pumps and the need for thicker pipes.

Many of the currently manufactured pressure-compensating emitters are derivatives of a dripper patented in 1949 as U.S. Pat. No. 2,460,647. The Jain Irrigation Company is a major current-day pressure-compensating emitter manufacturer. Typical Jain Irrigation emitters have an activation pressure of 1.0 bar and an operating range of 3 bars in an 8 liter/hour dripper.

An object of the present invention is a pressure-compensating emitter that has a low activation pressure of around 0.15 bar and large operating range beyond 4 bars to ensure uniform water distribution on a large field. Another object of the invention is an iterative design procedure for designing pressure-compensating emitters with low activation pressure and larger operating range.

SUMMARY OF THE INVENTION

The pressure-compensating emitter according to the invention includes an inlet connected to a source of pressurized water and an orifice in fluid communication with the inlet and extending into a channel including a raised land surrounding an outlet. A compliant membrane is positioned above the land in the chamber wherein the pressurized water will cause the membrane to deform into contact with the land to alter flow through the outlet. The dimensions of the orifice, land diameter, channel dimensions and outlet diameter along with membrane characteristics are selected to provide substantially constant flow for varying water pressure with an activation pressure of 0.15 bar or below.

BRIEF DESCRIPTION OF THE DRAWING

FIG. 1b is a cross-sectional view of the emitter of FIG. 1a.

DESCRIPTION OF THE PREFERRED EMBODIMENT

The pressure-compensating emitters of the invention utilize the same principles exhibited by other current pressure-compensating emitters. A compliant diaphragm sits on top of a pressure chamber and the flow path deforms under pressure and changes the cross section and length of the flow path resulting in approximate linear increases in resistances for increases in pressure resulting in a constant flow rate over a fluctuation and/or variation in pressure.

Figure 1A:
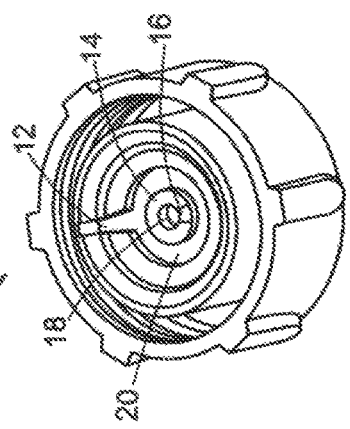
FIG. 1a is a perspective view of a typical prior art pressure-compensating emitter.
Figure 1B:
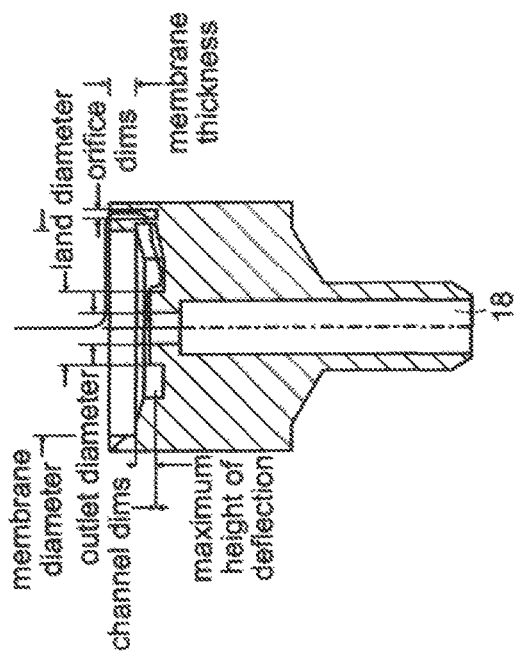

With reference first to FIGS. 1a and 1b, a typical emitter 10 includes an orifice 12, land 14, a channel 16, an outlet 18 and a chamber 20. As will be seen, the dimensions of these features affect activation pressure. The emitter 10 typically consists of tubular structures made from hard plastic usually injection molded. The compliant membrane within it deforms and leads to pressure-compensating behavior. FIGS. 1a and 1b illustrate the parameters that influence the emitter 10 performance. The parameters of interest with respect to the membrane are its material properties, thickness and diameter. Parameters of interest with regard to the rigid emitter body are the orifice dimensions, the land diameter, channel dimensions, maximum height of deflection of the unstressed membrane, and outlet diameter.

Figure 2:
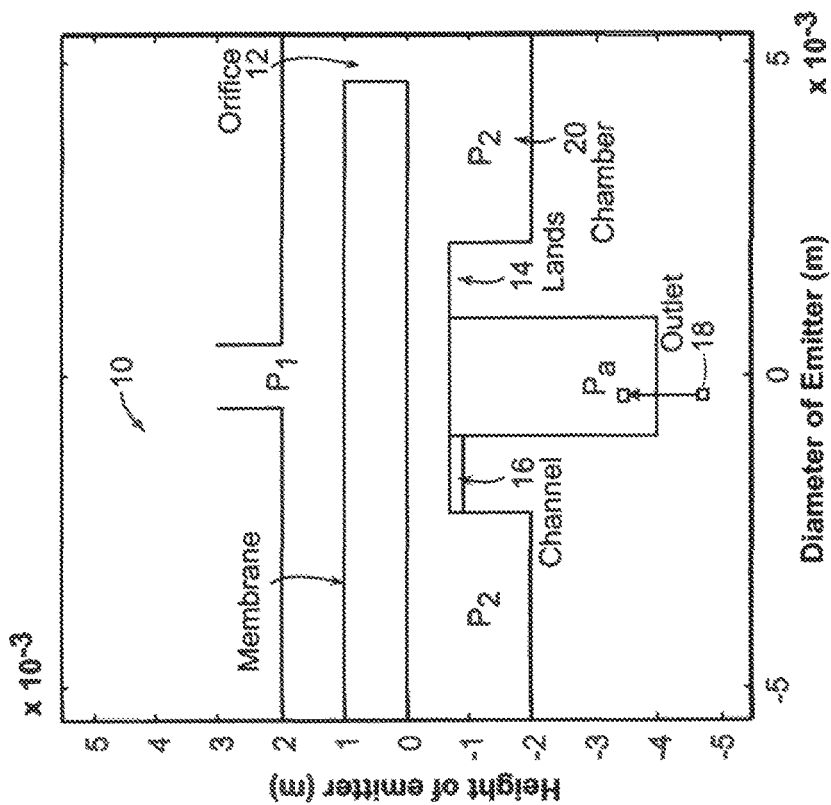
FIG. 2 is a cross-sectional view of an emitter as modeled for emitter analysis.

FIG. 2 depicts the cross section of the emitter as it was modeled. Fluid flows into the emitter 10 at an inlet pressure, P1. The fluid then flows into the chamber 20 under the membrane through an orifice 12 which leads to a pressure loss of ½ PV2κ. The fluid in the chamber at pressure P2 flows out of the emitter to the outside through the outlet hole 18.

To achieve the objective of low activation pressure and large operating range, the emitter of the invention is designed with an analysis of the fluid-structure interaction within a commonly used 8 l/hr. dripper and optimizes the parameters using a genetic algorithm. The fluid-structure interaction is modeled in "A Mathematical Model for Pressure Compensating Emitters," proceedings of the 2015 IDETC ASME 2015 International Design Engineering Technical Conference, Aug. 2, 2015, Boston, Mass. The contents of this reference by two of the inventors herein is incorporated herein by reference in its entirety. This paper presents a mathematical model investigating the physics behind pressure-compensating drip irrigation emitters and explains the relationship between pressure, structural deformation and fluid flow within a pressure-compensating emitter. The paper presents a parametric study to understand the effects of geometric and material properties with regard to activation pressure and pressure-compensating behavior.

Figure 3:
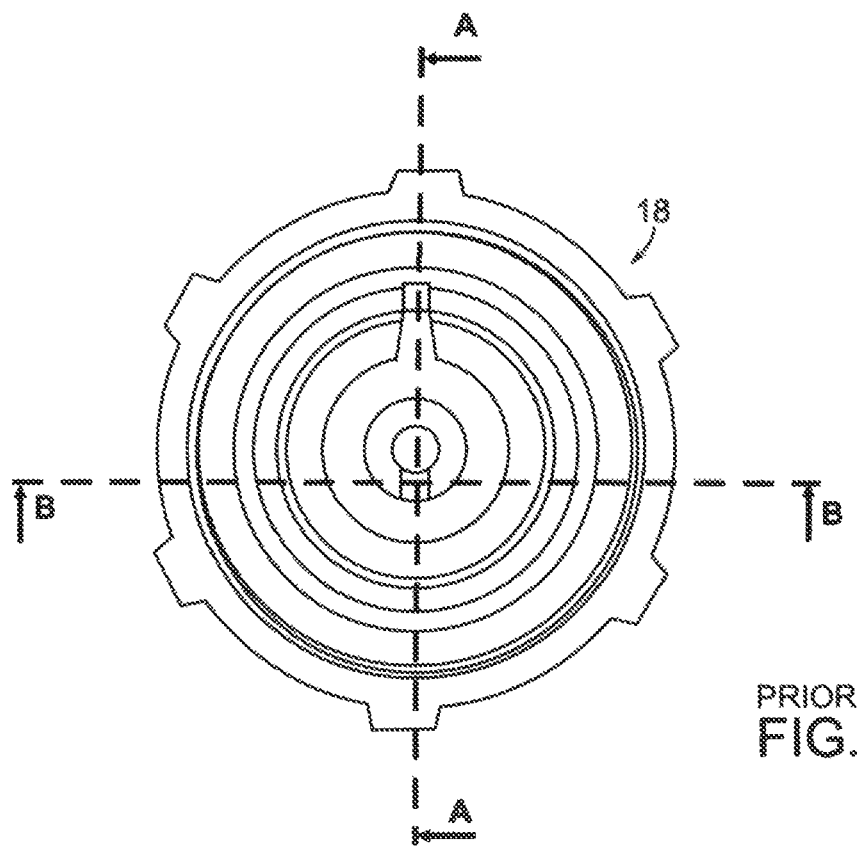
FIG. 3 is a plan view of a prior art Jain Irrigation emitter.
Figure 4:
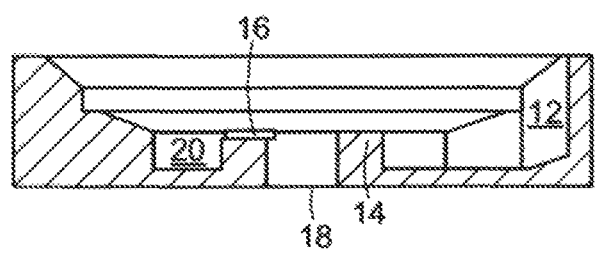
FIG. 4 is a cross-sectional view of section AA of FIG. 3.
Figure 5:
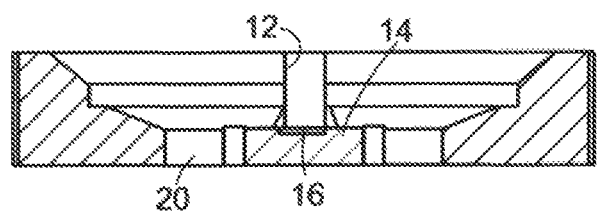
FIG. 5 is a cross sectional view along section BB of FIG. 3.

FIGS. 3, 4 and 5 are directed to existing pressure-compensating emitters from the Jain Irrigation Company. The relevant dimensions are noted on the figures.

Figure 6:
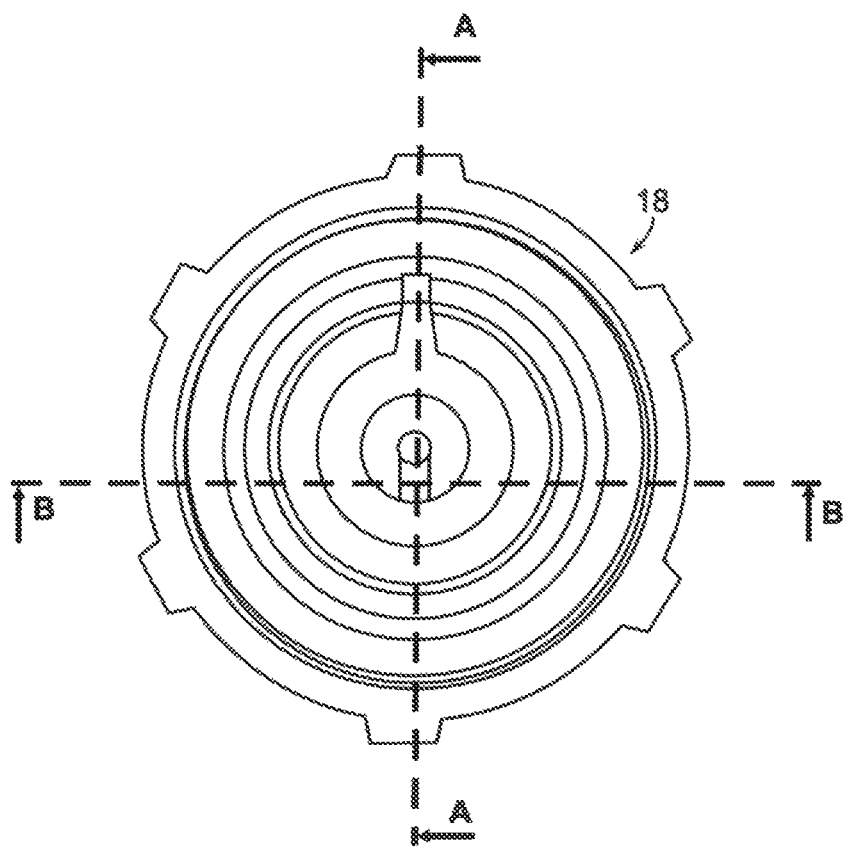
FIG. 6 is a plan view of an embodiment of an emitter disclosed herein for a flow rate of 8.2 lph.
Figure 7:
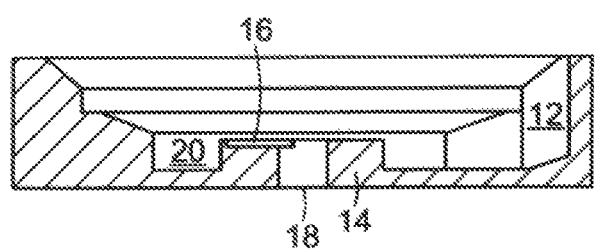
FIG. 7 is a cross-sectional view along section AA of FIG. 6.
Figure 8:
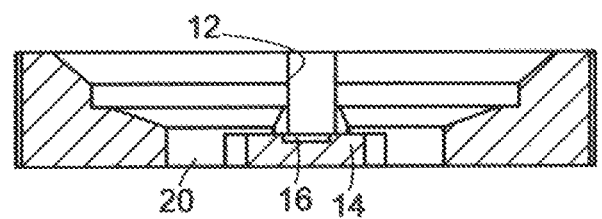
FIG. 8 is a cross-sectional view along section BB of FIG. 6.

FIGS. 6, 7 and 8 show details of the pressure-compensating emitter disclosed herein that achieves the low activation pressure of 0.15 bar or below and with an operating range beyond 4 bar. The circled dimensions on FIGS. 6, 7 and 8 highlight differences with respect to the Jain irrigation emitter shown in FIGS. 3, 4 and 5. Note in particular the orifice 12 in an embodiment of the present invention has a diameter of 1.25 mm as compared to a 1.07 mm diameter in the prior art. The outlet 18 according to an embodiment of the present invention has a diameter of approximately 1.28 millimeters as compared with a diameter of 1.89 millimeters in the prior art device. Also note that the membrane sits above the land by an amount of 0.7 mm in the emitter of the invention as compared to a dimension of 0.5 mm in the prior art device. The dimensions in FIGS. 6, 7 and 8 are entirely exemplary. As will be discussed further hereinbelow, a methodology is disclosed for performing a parameter study for other designs that meet the required specifications.

Figure 9:
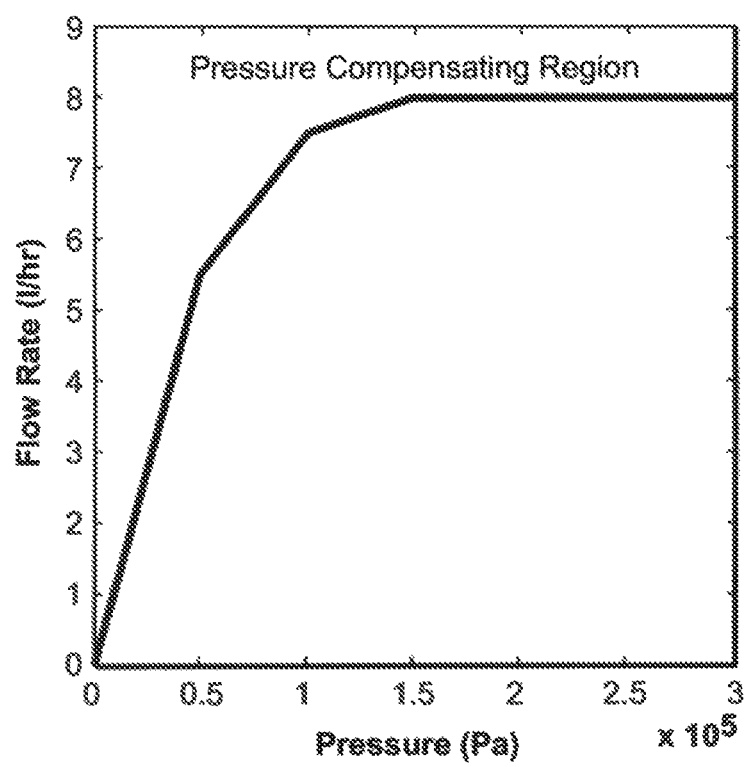
FIG. 9 is a representative graph of flow rate against pressure.

To achieve the objective of low activation pressure and larger operating range, the publication above incorporated by reference analyzes the fluid-structure interaction within a commonly used 8 l/hr. dripper and optimizes the parameter using a genetic algorithm. The analysis has been performed in MATLAB. It is important to note that the most relevant performance metric for an emitter is a flow rate versus pressure graph such as the representative graph shown in FIG. 9 and illustrating the pressure-compensating region.

Figure 10:
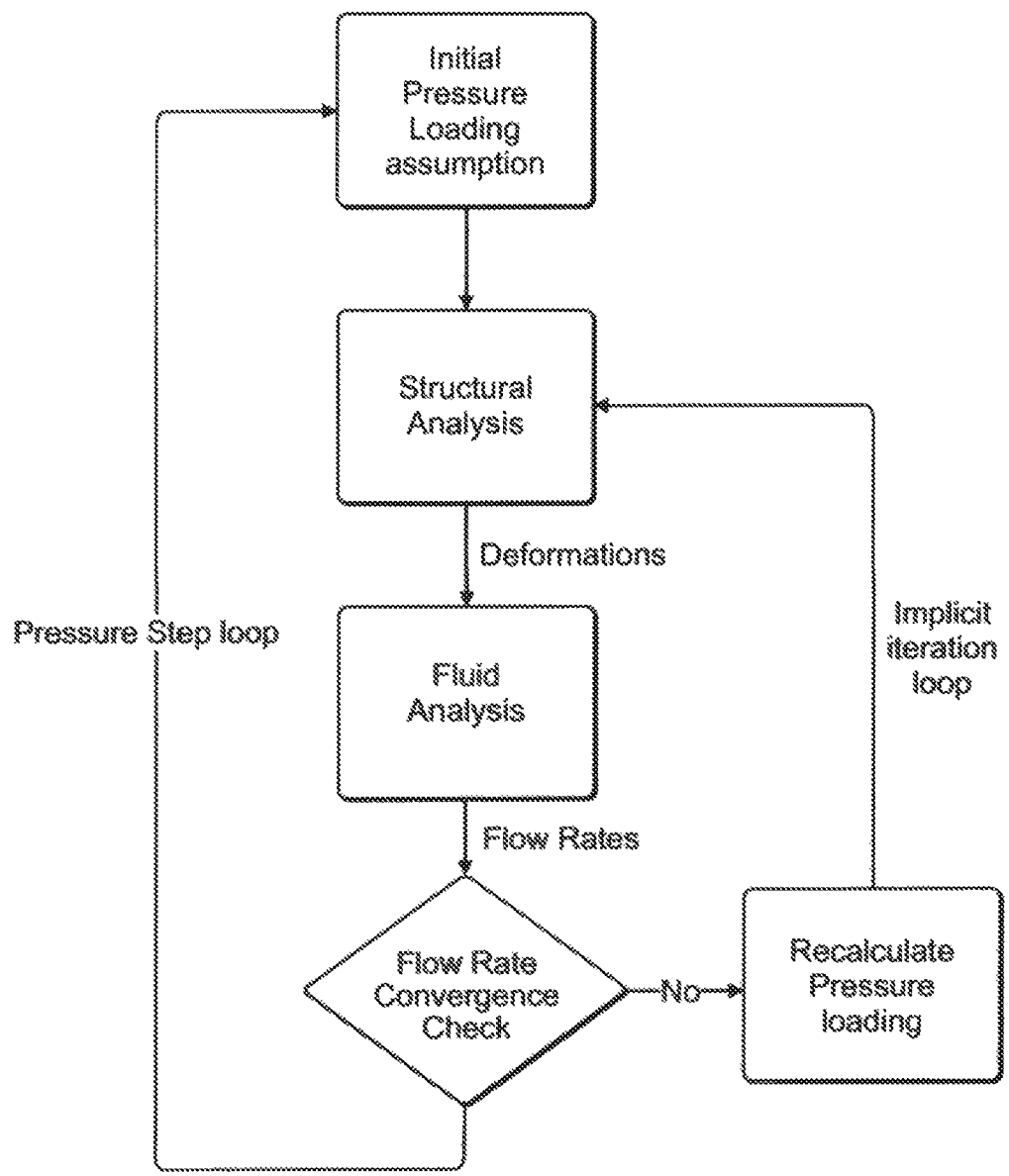
FIG. 10 is a flow diagram showing the iteration process for designing the low activation pressure, large operating range pressure-compensating emitter of the invention.

The steps undertaken in the analyses are summarized below. Details may be found in the incorporated paper. To obtain a flow versus pressure graph the analysis determines the flow rate at each pressure point. The steps in the algorithm are shown in the flow chart of FIG. 10.

The first step in the procedure is to define the geometry of an emitter including the geometry of the solid portion and the compliant membrane. Next, in step 2, an estimate is made of the pressure loading for a specific inlet pressure. This loading is then used in a step 3 to calculate the compliant diaphragm deflection while interacting with the solid, non-compliant section of the emitter. As discussed in the incorporated paper, the deflection is split into two sections, namely, bending deflection up to the channel and shearing deflection into the channel. The bending deflection is calculated using small deflection formulae and linear superpositioning followed by conversion into a larger deflection using Timoshenko correction factors. Once the membrane or diaphragm touches the land, a circular line force is induced preventing the diaphragm from deflecting any further. Any further deformation will occur in the channel 16 when the diaphragm shears into it.

The next step, step 4, is to calculate the fluid flow characteristics and, in particular, flow rates. Based on pressure loading and deflection of the diaphragm, a flow path is formed. Using the D'Arcy Weishbach equation coupled with Colebrook equations and mass continuity, loss coefficients and flow rates can be calculated. The next step, step 5, is to recalculate the pressure loading based on the flow rates calculated previously. Steps 3-5 are iterated until the flow rates calculated match the flow rates from the previous iteration to within 1%. Steps 2-5 are repeated for different inlet pressures in order to obtain a flow rate versus pressure graph for a pressure range of 0-4 bar.

After performing the genetic algorithm, experimental pieces were manufactured typically using rapid prototyping production techniques such as 3D printing and CNC milling. Hydraulic performance tests on experimental pieces were performed to obtain their flow rate against pressure graph for different geometries. The analytical model may be validated by comparing and analyzing the results obtained in the above steps. Correction factors can be added if needed. Optimization is performed on the current geometry to obtain other geometries that would meet the design requirements of being pressure-compensating with a low activation pressure and large range.

As stated earlier, the design process has been used to design an 8.2 l/hr emitter having an activation pressure of 0.15 bar and an operating range beyond 4 bar. This is in contrast to the Jain irrigation dripper at 8 l/hr. with an activation pressure of 1.0 bar and an operating range of 3 bar.

The pressure-compensating emitter of this embodiment of the invention has a flow rate of approximately 8.2 l/hr, large operating range of 0-4 bar and low activation pressure of 0.15 bar. Hydraulic performance tests have shown the emitter of the invention to have a low flow exponent, consistency, high uniformity and good anti-clogging performance.

The major improvements of the emitter of the invention are an increased range of operating pressure and, most importantly, lower activation pressure.

Figure 11A:
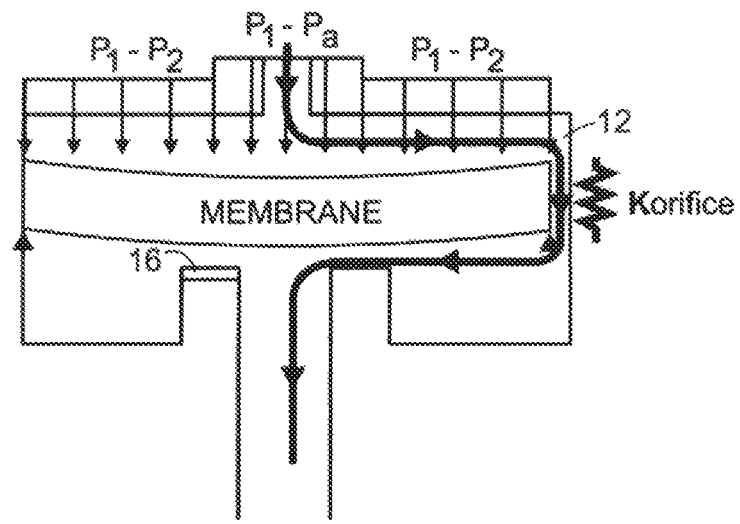
FIG. 11a is a cross-sectional view of an emitter of an embodiment of the invention showing bending of the flexible membrane under initial loading.

With reference now to FIGS. 11a-d, one can see that there are two main flow regimes affecting pressure, namely, flow through the orifice 12 and then through the channel 16. FIG. 11a shows bending of the flexible membrane under initial loading. The primary flow restriction is caused by $k_{orifice}$ illustrated by a resistor symbol. Loss coefficient versus inlet pressure is plotted 225 in the first portion of FIG. 11d.

Figure 11B:
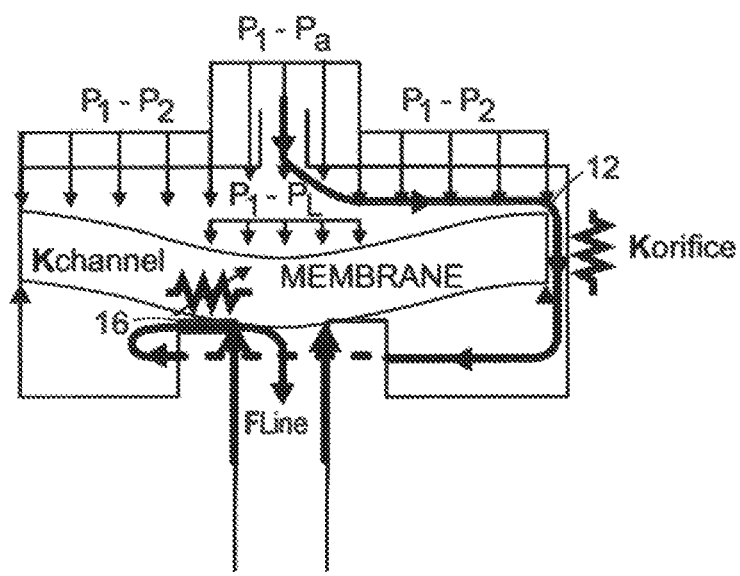
FIG. 11b is a cross-sectional view of an embodiment of the invention illustrating the membrane shearing into the channel.
Figure 11C:
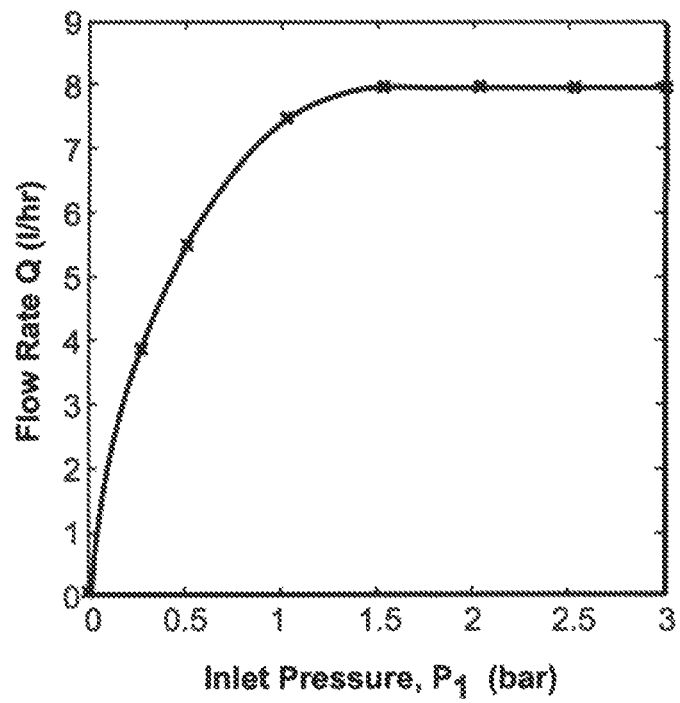
FIG. 11c is a graph of flow rate versus inlet pressure.
Figure 11D:
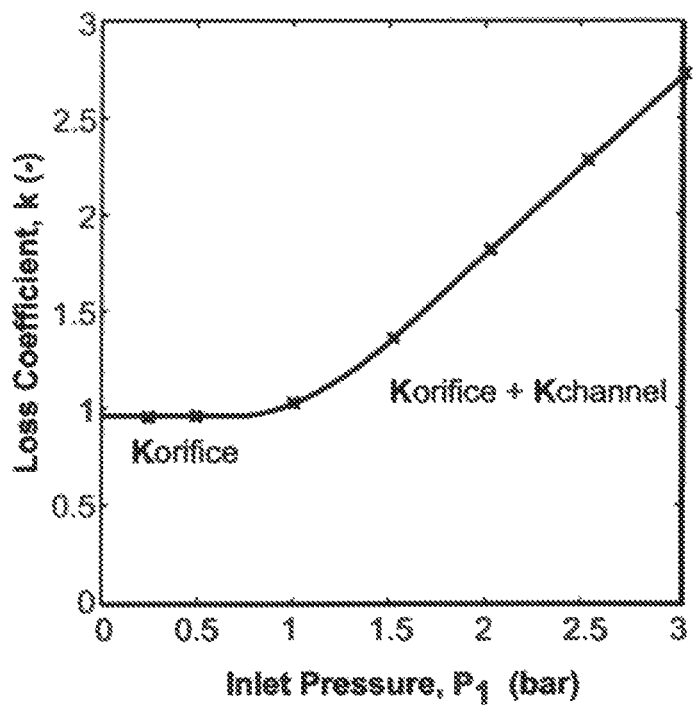
FIG. 11d is a graph of loss coefficient versus inlet pressure.

As shown in FIG. 11b, the flexible membrane shears into the channel 16. In this regime, flow restriction is caused by the sum of $k_{orifice}$ and the variable resistance of $k_{channel}$ that increases with rising inlet pressure as shown in FIG. 11d. FIG. 11c shows flow rate versus inlet pressure for pressure compensating behavior.

For the two regimes, pressure loss in the orifice affects activation pressure (i.e., if $k_{orifice}$ is low, activation pressure will be lower) and pressure loss in the channel affects pressure compensating behavior.

Figure 12:
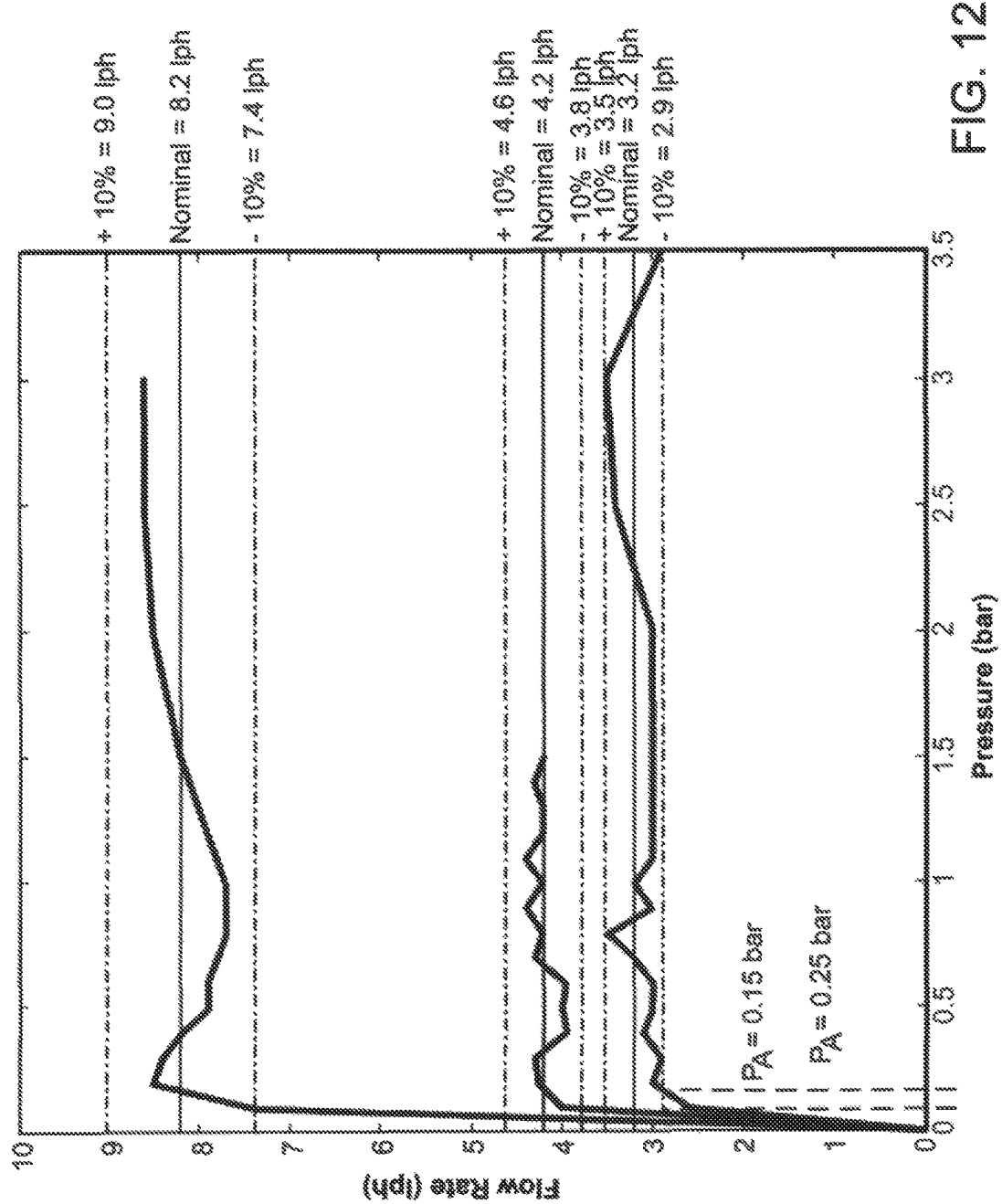
FIG. 12 is a graph of flow rate versus pressure for emitters having nominal 8.2 lph, 4.2 lph and 3.2 lph.

FIG. 12 is another graph of flow rate versus pressure for emitters having nominal flow rates of 8.2, 4.2, and 3.2 liters per hour (lph). Note that the activation pressure is 0.15 bar for the nominal 8.2 lph emitter and an activation pressure of 0.25 bar for the nominal 4.2 and 3.2 lph emitters.

Figure 13:
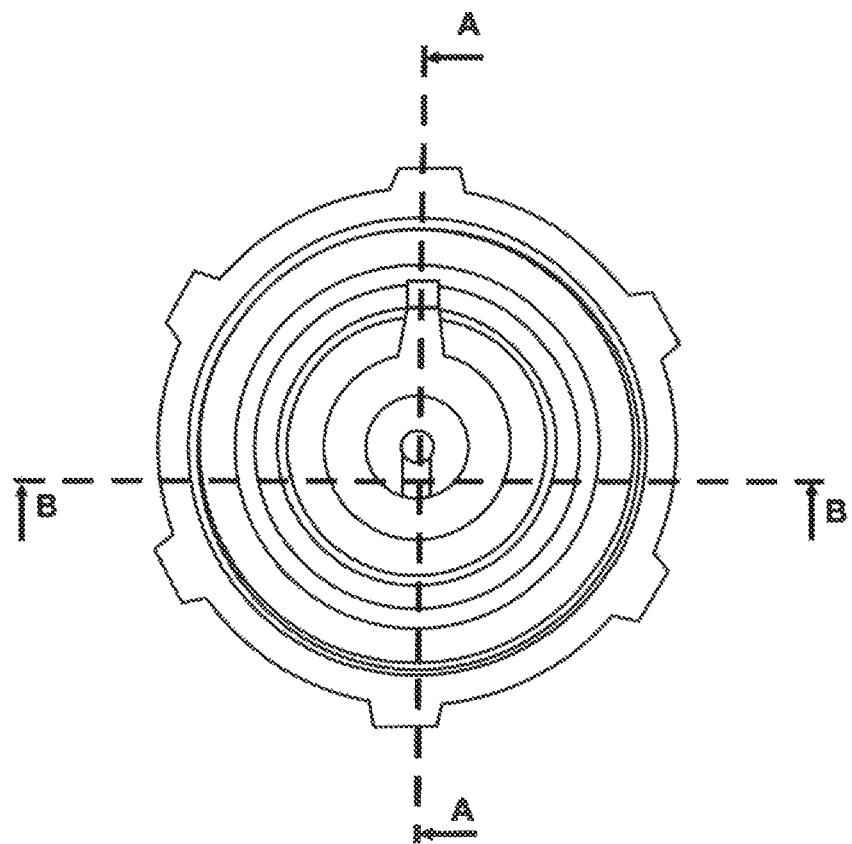
FIG. 13 is a plan view of an embodiment of an emitter disclosed herein for a nominal flow rate of 4.2 lph.
Figure 14:
FIG. 14 is a cross-sectional view along section AA of FIG. 13.
Figure 15:
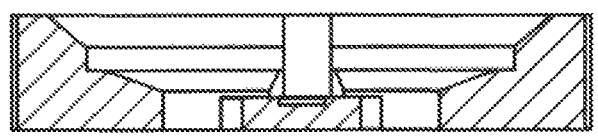
FIG. 15 is a cross-sectional view along section BB of FIG. 13.
Figure 16:
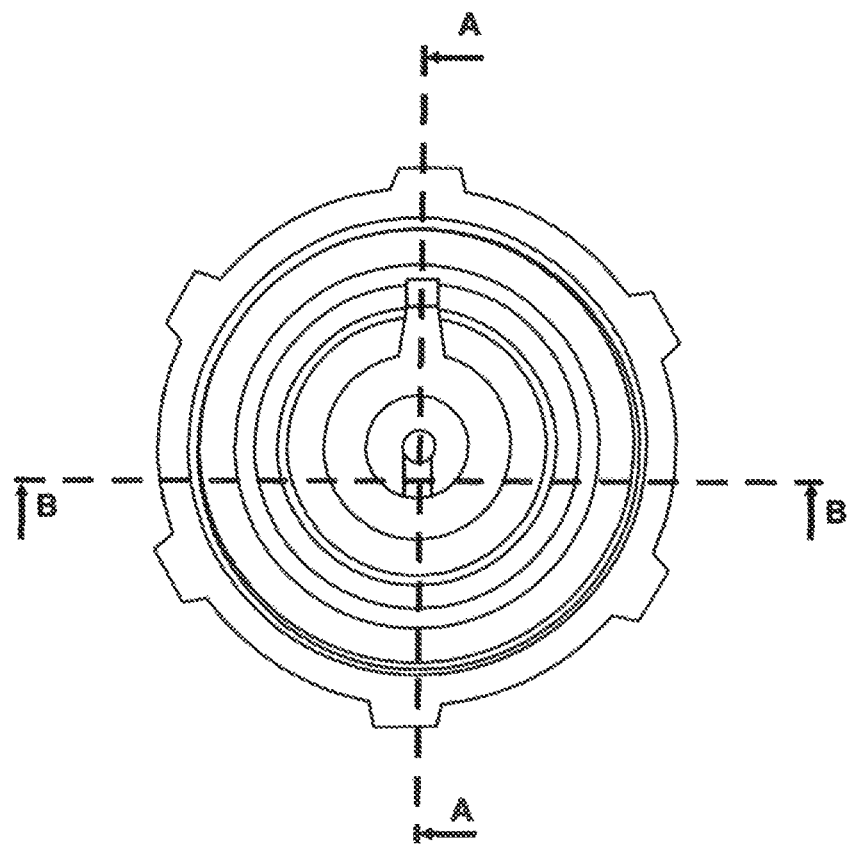
FIG. 16 is a plan view of an embodiment of an emitter having a nominal flow rate of 3.2 lph.
Figure 17:
FIG. 17 is a cross-sectional view along section AA of FIG. 16.
Figure 18:
FIG. 18 is a cross-sectional view along section BB of FIG. 16.

FIGS. 13, 14 and 15 illustrate an embodiment of the emitter disclosed herein for delivering a nominal 4.2 liters per hour flow rate with an activation pressure of 0.25 bar. The relevant parameter dimensions are shown in the circles in FIGS. 13, 14 and 15. FIGS. 16, 17 and 18 are corresponding figures for an embodiment with a nominal flow rate of 3.2 liters per hour. Again, the relevant parameters are listed in the circles.

It is recognized that modifications and variations of the invention will be apparent to those of ordinary skill in the art and it is intended that all such modifications and variations be included within the scope of the appended claims.

What is claimed is:

1. Pressure-compensating emitter comprising:
an inlet connected to a source of pressurized water;
an orifice in fluid communication with the inlet and extending into a channel including a raised land surrounding an outlet; and
a compliant membrane positioned above the land in the chamber wherein the pressurized water will cause the membrane to deform into contact with the land to alter flow through the outlet;
wherein dimensions of the orifice, land diameter, channel dimensions, outlet diameter and membrane characteristics are selected to provide substantially constant flow for varying water pressure with an activation pressure of 0.15 bar or below wherein the compliant membrane sits above the raised land by approximately 0.7 mm.

2. Pressure-compensating emitter comprising:
an inlet connected to a source of pressurized water;
an orifice in fluid communication with the inlet and extending into a channel including a raised land surrounding an outlet; and
a compliant membrane positioned above the land in the chamber wherein the pressurized water will cause the membrane to deform into contact with the land to alter flow through the outlet;
wherein dimensions of the orifice, land diameter, channel dimensions, outlet diameter and membrane characteristics are selected to provide substantially constant flow for varying water pressure with an activation pressure of 0.15 bar or below wherein the orifice has a diameter of approximately 1.25 mm, the outlet has a diameter of approximately 1.28 mm and wherein the compliant membrane sits above the raised land by approximately 0.7 mm.

3. Pressure compensating emitter comprising:
an inlet connected to a source of pressurized water;
an orifice having a diameter of approximately 1.25 mm in fluid connection with the inlet and extending into a channel including a raised land surrounding an outlet having a diameter of approximately 1.28 mm; and
a compliant membrane positioned approximately 0.7 mm above the land in the chamber wherein the pressurized water will cause the membrane to deform into contact with the land to alter flow through the outlet;
whereby the emitter provides substantial constant flow for varying water pressure with an activation pressure of 0.15 bar or below.

4. Pressure-compensating emitter comprising:
an inlet connected to a source of pressurized water;
an orifice in fluid communication with the inlet and extending into a channel including a raised land having an end face surrounding an outlet; and
a compliant membrane positioned above the raised land in the chamber wherein the pressurized water causes the membrane to deform into contact with the end face of the raised land to alter flow through the outlet;
wherein dimensions of the orifice, land diameter, channel dimensions, outlet diameter and membrane characteristics are selected to provide substantially constant flow for varying water pressure with an activation pressure of 0.25 bar or below.

5. The emitter of claim 4 wherein the orifice has a diameter of approximately 1.25 mm.

6. The emitter of claim 4 wherein the outlet has a diameter of approximately 1.20 mm.

7. The emitter of claim 4 wherein the compliant membrane sits above the raised land by approximately 0.3 mm.

8. The emitter of claim 4 wherein the orifice has a diameter of approximately 1.25 mm, the outlet has a diameter of approximately 1.20 mm wherein the compliant membrane sits above the raised land by approximately 0.3 mm and the channel depth within the raised land is approximately 0.15 mm.

9. The emitter of claim 4 wherein the channel within the raised land has a depth of approximately 0.125 mm.

10. The emitter of claim 4 within the orifice has a diameter of approximately 1.25 mm, the outlet has a diameter of approximately 1.20 mm wherein the compliant membrane sits above the raised land by approximately 0.3 mm and the channel depth within the raised land is approximately 0.125 mm.

11. The emitter of claim 4 wherein the activation pressure is 0.15 bar or below.

12. Pressure-compensating emitter comprising:
an inlet connected to a source of pressurized water;
an orifice in fluid communication with the inlet and extending into a channel including a raised land surrounding an outlet; and
a compliant membrane positioned above the land in the chamber wherein pressurized water will cause the membrane to deform into contact with the land to alter flow through the outlet;
wherein dimensions of the orifice, land diameter, channel dimensions, outlet diameter and membrane characteristics are selected to provide substantially constant flow for varying water pressure with an activation pressure of 0.15 bar or below wherein the channel within the raised land has a depth of approximately 0.15 mm.

* * * * *